(12) United States Patent
Okabe et al.

(10) Patent No.: US 10,449,912 B2
(45) Date of Patent: Oct. 22, 2019

(54) VEHICLE BODY STRUCTURE

(71) Applicant: HONDA MOTOR CO., LTD., Tokyo (JP)

(72) Inventors: Koji Okabe, Wako (JP); Tomoyuki Fujiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 49 days.

(21) Appl. No.: 15/928,218

(22) Filed: Mar. 22, 2018

(65) Prior Publication Data

US 2018/0281705 A1 Oct. 4, 2018

(30) Foreign Application Priority Data

Mar. 31, 2017 (JP) .................. 2017-072028

(51) Int. Cl.
| | | |
|---|---|---|
| *B60R 13/07* | (2006.01) | |
| *B60J 1/02* | (2006.01) | |
| *B62D 25/04* | (2006.01) | |
| *B60J 10/25* | (2016.01) | |
| *B60J 10/70* | (2016.01) | |

(52) U.S. Cl.
CPC .................. *B60R 13/07* (2013.01); *B60J 1/02* (2013.01); *B60J 10/25* (2016.02); *B60J 10/70* (2016.02); *B62D 25/04* (2013.01)

(58) Field of Classification Search
CPC ....... B60J 1/002; B60J 1/02; B60J 1/20; B60J 10/70; B60R 13/07; B62D 25/04
USPC ................................. 296/84.1, 96.15, 96.21
See application file for complete search history.

(56) References Cited

U.S. PATENT DOCUMENTS

| | | | | |
|---|---|---|---|---|
| 8,322,776 B2* | 12/2012 | Fioravanti | .............. | B60J 1/2005 15/250.01 |
| 2003/0184114 A1* | 10/2003 | Huang | ..................... | B60J 10/35 296/96.21 |
| 2011/0080018 A1* | 4/2011 | Renke | ...................... | B60J 10/70 296/146.15 |
| 2016/0129771 A1* | 5/2016 | Nakai | ........................ | B60J 1/02 296/93 |
| 2018/0037175 A1* | 2/2018 | Tsutsumi | .................. | B60J 1/02 |

FOREIGN PATENT DOCUMENTS

JP      H11-334358 A     12/1999

* cited by examiner

*Primary Examiner* — Jason S Daniels
(74) *Attorney, Agent, or Firm* — Thomas| Horstemeyer, LLP

(57) ABSTRACT

A vehicle body structure includes a drain member arranged along an edge of a glass window. The drain member includes a surface exposed to an outside of a vehicle, a drain passage extending in a direction along the edge of the glass window and formed to be hollow, and a communication path having one end communicating with the drain passage and the other end communicating with the surface of the drain member. The communication path is formed to have a width that draws water from the surface into the drain passage by a capillarity phenomenon, and a width of the drain passage in a direction orthogonal to the direction is formed to be wider than the width of the communication path.

8 Claims, 4 Drawing Sheets

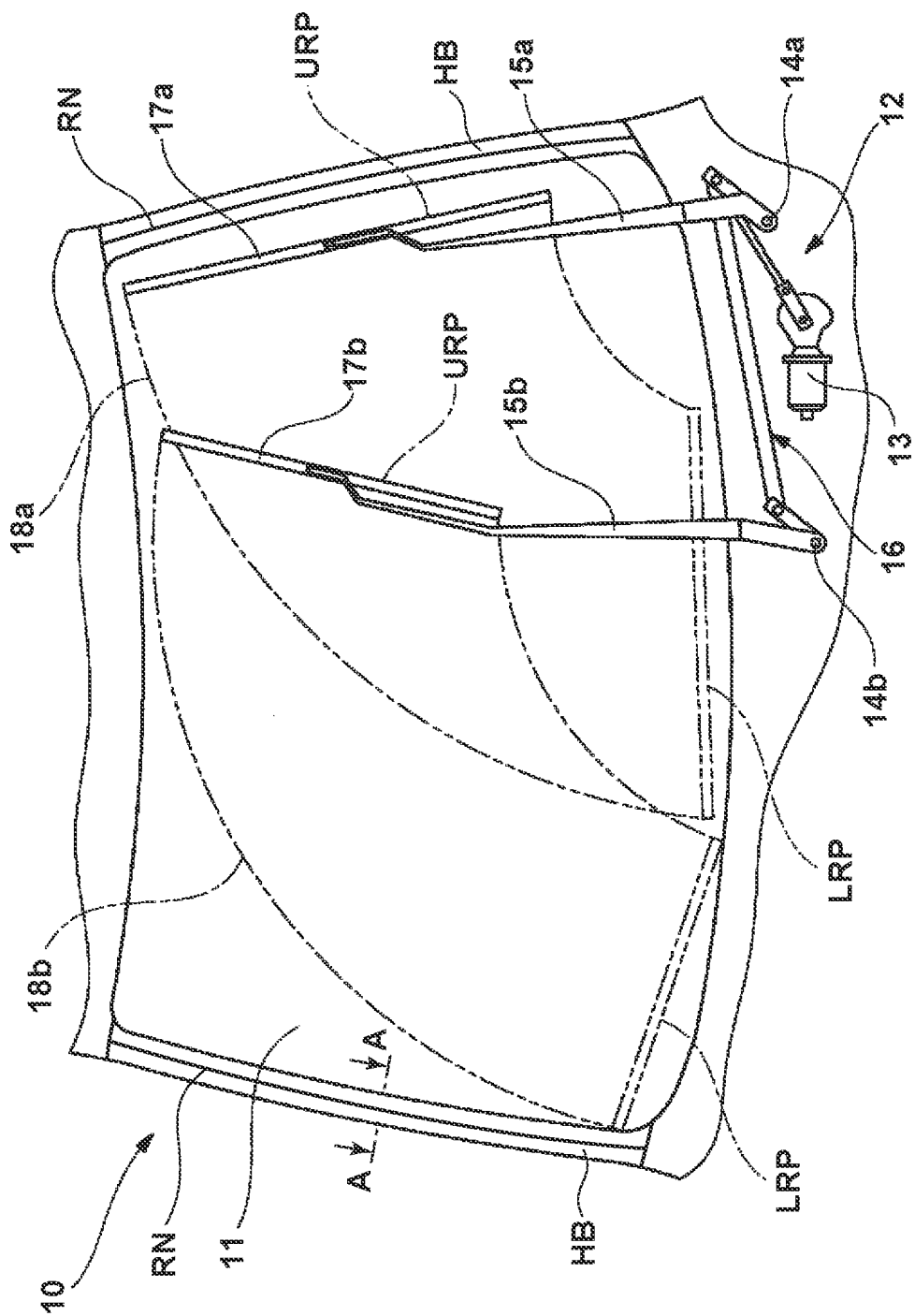

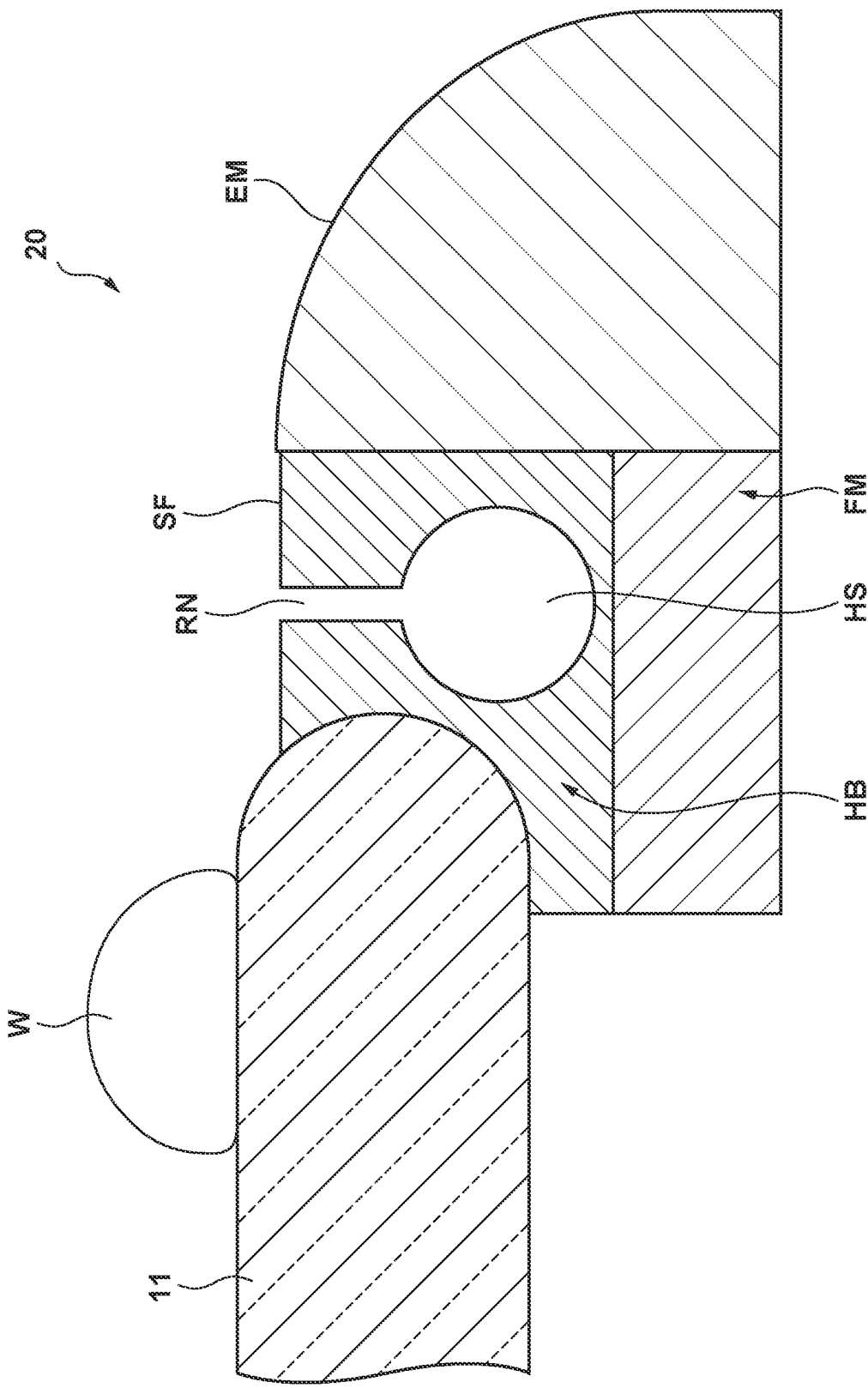

VEHICLE BODY STRUCTURE

BACKGROUND OF THE INVENTION

Field of the Invention

The present invention relates to a vehicle body structure including a drain member arranged along the edge of a glass window.

Description of the Related Art

Conventionally, a vehicle such as a car is mounted with a wiper device that ensures the visual field of a driver by wiping rainwater, dust, and the like adhering to a windshield. The wiper device includes a wiper arm that is swingably driven by an electric motor, and a wiper blade that is mounted on the wiper arm. The wiper blade includes a holder main body pivotably mounted on the distal end of the wiper arm, and a blade rubber held by the holder main body. When the blade rubber elastically contacts the windshield by the pressing force of the wiper arm and the elastic force of a vertebra, and the electric motor is thus driven to swingably drive the wiper arm, the blade rubber performs a reciprocating wiping operation on the windshield.

As an arrangement of draining rainwater wiped by such wiper blade, for example, Japanese Patent Laid-Open No. 11-334358 discloses an arrangement in which a drain gutter 2 is formed in a water guide 3 provided along the side edge of a front glass window 1 and lip-shaped ribs 4 for accelerating drainage of water to the drain gutter 2 are provided.

However, in the above-described arrangement disclosed in Japanese Patent Laid-Open No. 11-334358, water entering the drain gutter 2 can be dropped in fine water channels formed by the ribs 4, and drained without creating any large waterdrop. However, since it is impossible to actively draw water from the front glass window 1 into the drain gutter 2, the amount of water that can be drained is limited.

The present invention provides a vehicle body structure including a drain member capable of draining, from a drain passage, water drawn from a communication path by a capillarity phenomenon in order to drain more water.

SUMMARY OF THE INVENTION

According to one aspect of the present invention, there is provided a vehicle body structure including a drain member arranged along an edge of a glass window, wherein the drain member includes a surface exposed to an outside of a vehicle, a drain passage extending in a direction along the edge of the glass window and formed to be hollow, and a communication path having one end communicating with the drain passage and the other end communicating with the surface of the drain member, and wherein the communication path is formed to have a width that draws water from the surface into the drain passage by a capillarity phenomenon, and a width of the drain passage in a direction orthogonal to the direction is formed to be wider than the width of the communication path.

According to the present invention, it is possible to provide a vehicle body structure capable of draining, from a drain passage, water drawn from a communication path of a drain member.

Further features of the present invention will become apparent from the following description of exemplary embodiments (with reference to the attached drawings).

BRIEF DESCRIPTION OF THE DRAWINGS

FIG. 1 is a view for schematically explaining the vehicle body structure of a vehicle;

FIG. 2 is a sectional view taken along a line A-A in FIG. 1;

DESCRIPTION OF THE EMBODIMENTS

Figure 3A:
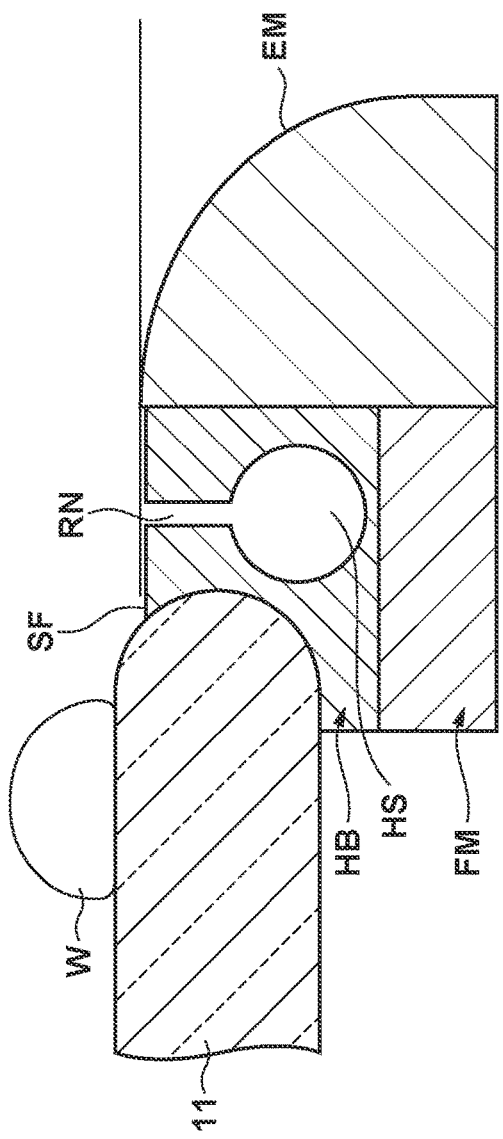
FIG. 3A is a view showing the arrangement of a drain member in the vehicle body structure according to an embodiment.

An embodiment of the present invention will be described below with reference to the accompanying drawings. Note that the constituent elements described in the embodiment are merely examples. The technical scope of the present invention is determined by the scope of claims and is not limited by the following individual embodiment.

FIG. 1 is a view for schematically explaining the vehicle body structure of a vehicle. FIG. 2 is a sectional view taken along a line A-A in FIG. 1 and showing the sectional arrangement of the vehicle body structure including a drain member HB arranged along the edge of a glass window (front glass window 11). Note that FIG. 1 exemplarily shows the front part of a vehicle body as a vehicle body structure. However, the vehicle body structure according to this embodiment is not limited to this, and includes a vehicle body structure including a drain member HB arranged along the edge of a glass window (side or rear glass window) in the side or rear part of the vehicle. The edge of the glass window includes the upper and lower edges of the glass window in addition to the side edge of the glass window.

As shown in FIG. 1, the front glass window 11 as a windshield is provided on the front side of a vehicle 10 such as a car, and a wiper device 12 for ensuring the visual field of a driver by wiping rainwater, dust, and the like (not shown) adhering to the front glass window 11 is provided on the front side of the front glass window 11. The wiper device 12 is mounted in a cowl top or the like (not shown) located on the rear side of the engine room of the vehicle 10.

The wiper device 12 includes a wiper motor 13 as an electric motor rotationally driven by operating a wiper switch (not shown) provided in the interior of the vehicle or the like, pivot shafts 14a and 14b on a driver's seat side (DR-side) and passenger seat side (AS-side), both of which are pivotably provided in the vehicle 10, DR- and AS-side wiper arms 15a and 15b having proximal ends respectively fixed to the pivot shafts 14a and 14b and distal ends each performing a swing motion on the front glass window 11, and a link mechanism 16 for converting a rotational motion of the wiper motor 13 into a swing motion of each wiper arm 15a or 15b.

DR- and AS-side wiper blades 17a and 17b formed similarly are respectively mounted on the distal ends of the wiper arms 15a and 15b to be pivotable in the vertical direction of the front glass window 11, and the wiper blades 17a and 17b are configured to elastically contact the front glass window 11 by springs (not shown) provided in the wiper arms 15a and 15b, respectively. That is, the pressing forces of the wiper arms 15a and 15b are transmitted to the wiper blades 17a and 17b, respectively. By rotationally driving the wiper motor 13, each of the wiper blades 17a and 17b performs a reciprocating wiping operation within each of wiping ranges 18a and 18b indicated by two-dot dashed lines in FIG. 1 on the front glass window 11, that is, between a lower reversal position (the stop position of the wiper arm)

LRP as a lower position along the lower edge of the front glass window 11 and an upper reversal position URP as an upper position along the side edge of the front glass window 11.

In the example shown in FIG. 1, the drain member HB is arranged along the edge of the front glass window 11. The drain member HB is made of a resin material such as plastic having flexibility so that it can be arranged along the edge of the front glass window 11. A communication path RN for drawing water by a capillarity phenomenon is provided in the drain member HB. Note that FIG. 1 exemplifies an arrangement in which the drain member HB is arranged on the side edge of the front glass window 11. However, the present invention is not limited to this, and the drain member HB may be arranged along, for example, the upper or lower edge.

The arrangement of the drain member HB in the vehicle body structure will be described in detail below with reference to FIGS. 2, 3A, 3B, 4A, and 4B. As shown in FIG. 2, the drain member HB includes a surface SF exposed to the outside of the vehicle, a drain passage HS extending in a direction along the edge of the front glass window 11 and formed to be hollow, and the communication path RN having one end communicating with the drain passage HS and the other end communicating with the surface SF of the drain member HB. The communication path RN is formed to have a width that draws water from the surface SF of the drain member HB into the drain passage HS by a capillarity phenomenon. In a vehicle body structure 20, the communication path RN is formed in a direction along the edge of the glass window. With this arrangement of the communication path RN, it is possible to actively draw, into the drain passage HS, more water adhering to the surface of the drain member HB by the capillarity phenomenon of the communication path RN formed in the direction along the edge of the glass window.

The width of the communication path RN is formed in a direction that is along the surface of the front glass window 11 and orthogonal to the direction along the edge of the front glass window 11. The width of the drain passage HS in the direction orthogonal to the direction along the edge of the front glass window 11 is formed to be wider than that of the communication path.

In the vehicle body structure according to this embodiment, it is possible to actively draw, into the drain passage HS, water adhering to the surface SF of the drain member HB by the capillarity phenomenon of the communication path RN. Furthermore, it is possible to quickly discharge, by the drain passage HS with a width wider than that of the communication path RN, the water drawn by the communication path RN, thereby drawing more water.

As shown in FIG. 2, the surface SF of the drain member HB is provided at a position closer to a vehicle body FM than the surface of the front glass window 11. That is, a step is formed between the surface SF of the drain member and the surface of the front glass window 11. When wind flowing to the surface of the front glass window 11 flows to the side of the drain member HB, a negative pressure is generated at the position of the step. Since it is possible to draw water W on the surface side of the front glass window 11 to the side of the drain member HB by the negative pressure generated at the position of the step, the water can be drained by the drain member HB more effectively.

The drain member HB has left and right edge portions, the left edge portion contacts the front glass window 11, and an outer surface member EM is provided along the right edge portion as the edge portion on the opposite side of the left edge portion contacting the front glass window. The outer surface member EM includes, for example, a structure in which the surface of a front pillar is exposed as well as a structure in which the surface of a separate front pillar mall is exposed.

Figure 3B:
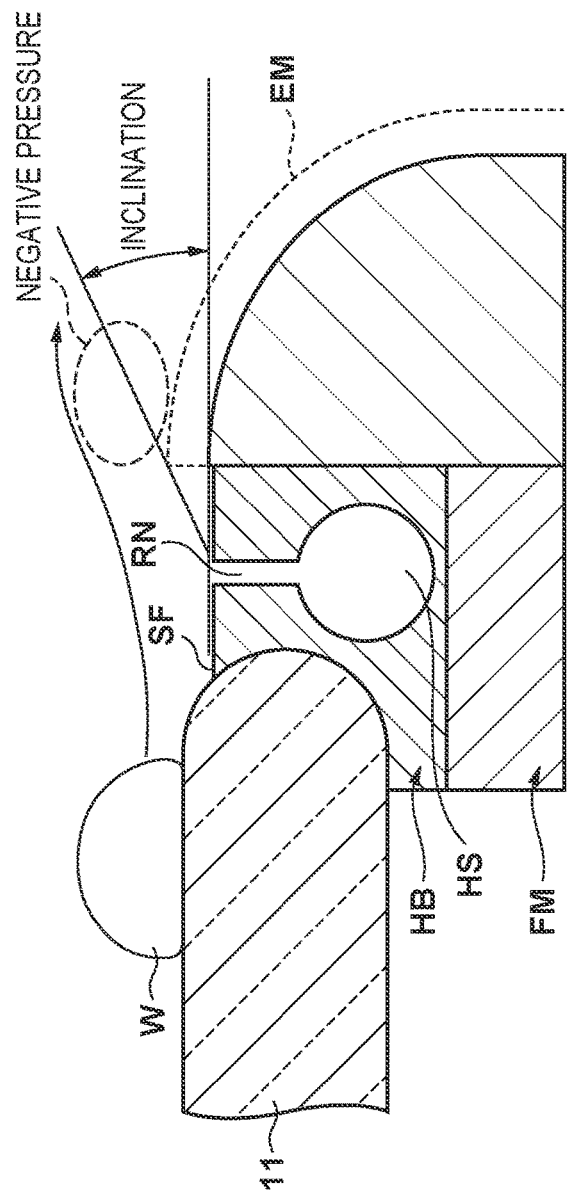
FIG. 3B is a view showing a comparative example.

FIG. 3A is a view showing the arrangement of the drain member HB in the vehicle body structure according to this embodiment. FIG. 3B is a view showing a comparative example. The comparative example shown in FIG. 3B shows an arrangement in which a step is formed between the surface SF of the drain member HB and the surface (broken line part) of the outer surface member EM. If a step is formed between the surfaces, the flow of wind from the front glass window 11 to the outer surface member EM changes in an inclination direction in FIG. 3B, as indicated by an arrow, and a negative pressure can be generated on the surface of the outer surface member EM. If a negative pressure is generated on the surface of the outer surface member EM, the water W passes over the surface SF of the drain member HB to the side of the outer surface member EM, thereby making it difficult to draw the water W into the communication path RN.

As shown in FIG. 3A, in the drain member HB in the vehicle body structure according to this embodiment, the surface SF of the drain member HB and the surface of the outer surface member EM are arranged to be almost flush with each other. When the surface of the drain member HB and that of the outer surface member EM are arranged to be almost flush with each other, it is possible to prevent a negative pressure from being generated on the surface of the outer surface member EM located near the boundary between the surfaces. With this arrangement, it is possible to draw the water W on the surface SF into the communication path RN more effectively, and drain the water W by the drain member HB. Note that "almost flush" allows a step to the extent that no negative pressure is generated on the surface of the outer surface member EM.

Figure 4A:
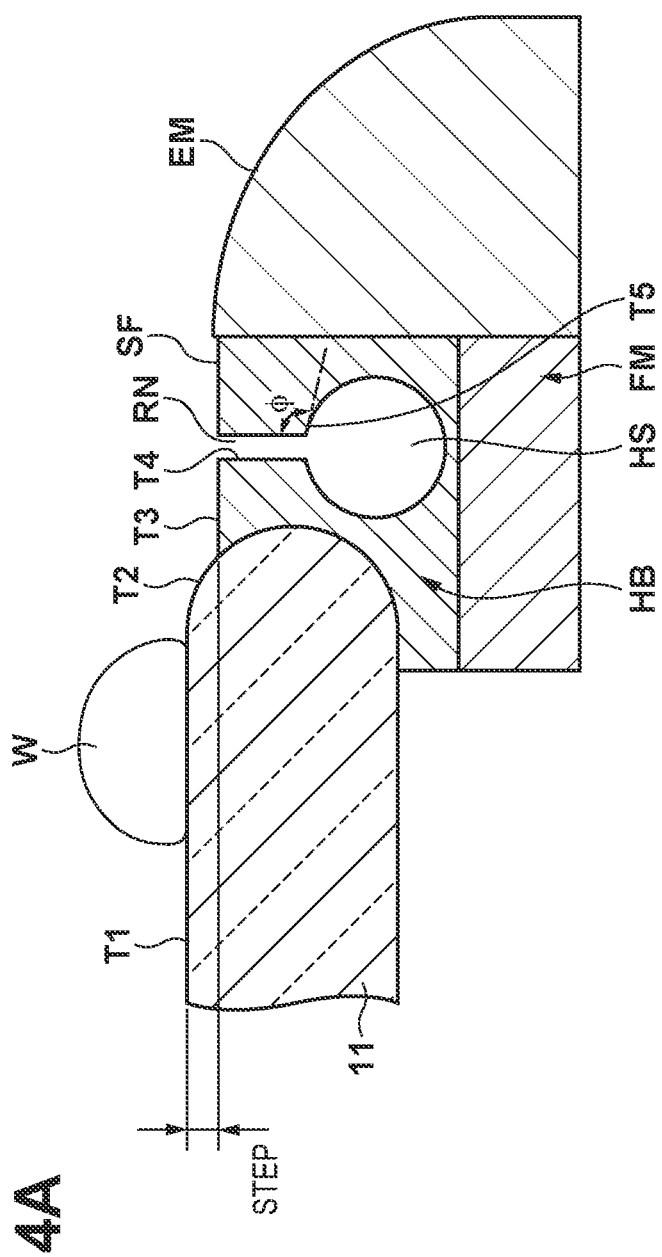
FIG. 4A is a view for explaining the arrangement of the drain member.

In FIG. 4A, reference symbol T1 denotes a surface tension on the surface of the front glass window 11; and T2, a surface tension in the glass window end polishing portion of the front glass window 11. Furthermore, reference symbol T3 denotes a surface tension on the surface of the drain member HB; T4, a surface tension in the communication path RN; and T5, a surface tension of the drain passage HS communicating with the communication path RN.

The surface SF of the drain member HB is arranged so that the surface tension T3 on the surface SF is higher than the surface tension T1 on the surface of the front glass window 11. Therefore, the surface tension T3 of the drain member HB is higher than the surface tension T1 of the front glass window 11, thereby making it possible to actively draw the water W from the side of the front glass window 11 to the side of the drain member HB.

Furthermore, the communication path RN is arranged so that the surface tension T4 of the communication path RN is higher than the surface tension T3 on the surface SF of the drain member HB. Therefore, the surface tension T4 of the communication path RN is higher than the surface tension T3 of the drain member HB, thereby making it possible to actively draw the water W from the side of the surface SF of the drain member HB to the side of the communication path RN.

For example, as shown in FIG. 4A, the communication path RN and the drain passage HS are arranged so that an angle $\phi$ formed by the surface of the communication path RN and a surface, contacting the communication path RN, of the drain passage HS, is obtuse. When T5 represents the surface tension of the drain passage HS communicating with the communication path RN, the drain passage HS is arranged so that the surface tension T5 of the drain passage HS is higher than the surface tension T4 of the communication path RN. With this arrangement, since it is possible to draw, by the surface tension T5 of the drain passage HS, the water W coming out from the communication path, the water W can be discharged from the communication path RN to the drain passage HS more effectively.

A path of the water W for draining the water W (waterdrop) on the surface of the front glass window 11 by the drain member HB is "surface of front glass window 11→glass window end polishing portion of front glass window 11→surface of drain member HB→communication path RN→drain passage HS". The water drawn into this path is discharged outside the vehicle from the drain passage HS.

At this time, since the surface tension T2 in the glass window end polishing portion of the front glass window 11 is lower than the surface tension T1 on the surface of the front glass window 11, some force is necessary to move the water W (waterdrop). In the vehicle body structure according to this embodiment, a step is formed between the surface of the front glass window 11 and the surface SF of the drain member HB, and the water W on the surface side of the front glass window 11 is drawn to the side of the drain member HB by the negative pressure generated at the position of the step. If the water W reaches the communication path RN on the surface SF of the drain member HB, it is possible to drain the water using the capillarity phenomenon.

Figure 4B:
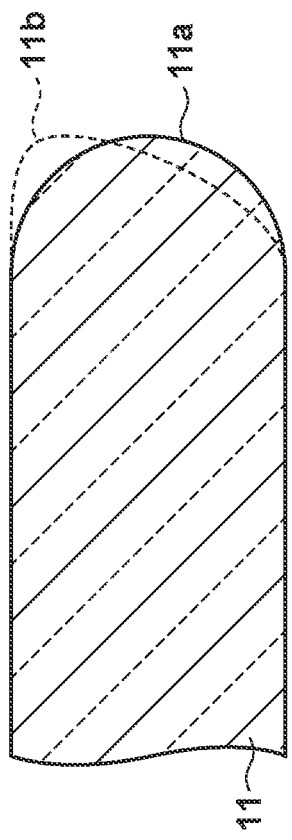
FIG. 4B is a view exemplifying the shape of a glass window end polishing portion of a front glass window.

FIG. 4B is a view exemplifying the shape of the glass window end polishing portion of the front glass window 11. By making the radius of curvature of the glass window end polishing portion smaller, as indicated by a shape 11b of the glass window end polishing portion represented by a broken line, as compared to a polishing shape 11a represented by a solid line, it is possible to obtain a higher negative pressure.

A length (Z) from one end to the other end of the communication path RN satisfies:

$$Z < 2T \cos \theta / (\gamma r) \quad (1)$$

T: surface tension of communication path RN
θ: contact angle between water and surface of communication path RN
γ: specific gravity of water
r: width of communication path RN/2

The contact angle indicates an angle formed, when the surface of the communication path (solid) contacts a liquid and a gas, by a liquid surface with a solid surface at a boundary where the three phases contact each other. In general, a tendency is indicated that the solid with a low surface tension readily gets wet and a contact angle when the liquid adheres is acute, and the solid with a high surface tension is difficult to get wet and a contact angle when the liquid adheres is obtuse. A drawing displacement (H) of the water W by the capillarity phenomenon is given by $H = 2T \cos \theta / (\gamma r)$ according to equation (1). By making the length (Z) of the communication path RN shorter than the drawing displacement (H) of the water W, it is possible to reliably draw, up to the drain passage HS, the water W drawn from the surface SF of the drain member HB, thereby implementing more effective drainage.

<Summary of Embodiment>

Arrangement 1. There is provided a vehicle body structure (for example, 20) according to the embodiment, including a drain member (for example, HB) arranged along an edge of a glass window (for example, 11), characterized in that
  the drain member (HB) includes
  a surface (for example, SF) exposed to an outside of a vehicle,
  a drain passage (for example, HS) extending in a direction along the edge of the glass window and formed to be hollow, and
  a communication path (for example, RN) having one end communicating with the drain passage and the other end communicating with the surface of the drain member,
  the communication path is formed to have a width that draws water from the surface into the drain passage by a capillarity phenomenon, and
  a width of the drain passage in a direction orthogonal to the direction is formed to be wider than the width of the communication path.

According to the embodiment of arrangement 1, it is possible to actively draw, into the drain passage HS, water adhering to the surface SF of the drain member HB by the capillarity phenomenon of the communication path RN. Furthermore, it is possible to quickly discharge, by the drain passage HS with a width wider than that of the communication path RN, the water drawn by the communication path RN, thereby drawing more water from the communication path RN into the drain passage HS.

Arrangement 2. There is provided the vehicle body structure (20) according to the embodiment, characterized in that the communication path (RN) is formed in the direction along the edge of the glass window.

According to the embodiment of arrangement 2, it is possible to actively draw, into the drain passage HS, more water adhering to the surface SF of the drain member HB by the capillarity phenomenon of the communication path RN formed in the direction along the edge of the glass window. Furthermore, it is possible to quickly discharge, by the drain passage HS with a width wider than that of the communication path RN, the water drawn by the communication path RN.

Arrangement 3. There is provided the vehicle body structure (20) according to the embodiment, characterized in that
  the glass window is a front glass window (for example, 11), and
  the surface (SF) is provided at a position closer to a vehicle body (for example, FM) than a surface of the front glass window.

According to the embodiment of arrangement 3, when wind flowing to the surface of the glass window flows to the side of the drain member HB, a negative pressure is generated at the position of a step. Since it is possible to draw water on the surface side of the glass window to the side of the drain member HB by the negative pressure generated at the position of the step, the water can be drained by the drain member HB more effectively.

Arrangement 4. There is provided the vehicle body structure (20) according to the embodiment, characterized in that
  the glass window is a front glass window,
  the structure further includes an exterior member (for example, EM) provided along an edge portion on an opposite side of an edge portion where the drain member and the front glass window contact each other, and
  a surface of the exterior member is provided to be substantially flush with the surface of the drain member.

According to the embodiment of arrangement 4, when the surface of the drain member HB and that of the outer surface member EM are formed to be almost flush with each other, it is possible to prevent a negative pressure from being generated near the boundary between the surfaces. With this arrangement, it is possible to draw water on the surface SF of the drain member HB into the communication path RN more effectively, and drain the water by the drain member HB.

Arrangement 5. There is provided the vehicle body structure (20) according to the embodiment, characterized in that a surface tension (for example, T3) on the surface (SF) of the drain member (HB) is higher than a surface tension (for example, T1) on a surface of the glass window (11).

According to the embodiment of arrangement 5, it is possible to actively draw water from the glass window side to the drain member side.

Arrangement 6. There is provided the vehicle body structure (20) according to the embodiment, characterized in that a surface tension (for example, T4) of the communication path (RN) is higher than a surface tension (T3) on the surface (SF) of the drain member (HB).

According to the embodiment of arrangement 6, it is possible to actively draw water from the side of the surface SF of the drain member HB to the side of the communication path RN.

Arrangement 7. There is provided the vehicle body structure (20) according to the embodiment, characterized in that an angle formed by a surface of the communication path and a surface, contacting the communication path, of the drain passage is obtuse.

According to the embodiment of arrangement 7, since it is possible to draw, by the surface tension T5 of the drain passage HS, the water coming out from the communication path, the water can be discharged from the communication path RN to the drain passage HS more effectively.

Arrangement 8. There is provided the vehicle body structure (20) according to the embodiment, characterized in that a length (Z) from the one end to the other end of the communication path satisfies:

$$Z < 2T \cos \theta / (\gamma r)$$

T: surface tension of communication path RN
θ: contact angle between water and surface of communication path RN
γ: specific gravity of water
r: width of communication path RN/2

According to the embodiment of arrangement 8, it is possible to reliably draw, up to the drain passage HS, the water drawn from the surface SF of the drain member HB, thereby implementing more effective drainage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-072028, filed Mar. 31, 2017, which is hereby incorporated by reference herein in its entirety.

What is claimed is:

1. A vehicle body structure including a drain member arranged along an edge of a glass window,
wherein the drain member includes
a surface exposed to an outside of a vehicle,
a drain passage extending in a length along the edge of the glass window and formed to be hollow, and
a communication path having one end communicating with the drain passage and an other end communicating with the surface of the drain member, and
wherein the communication path is formed to have a width that draws water from the surface into the drain passage by a capillarity phenomenon, and
a width of the drain passage in a direction orthogonal to the length is formed to be wider than the width of the communication path.

2. The structure according to claim 1, wherein the communication path is formed in the direction along the edge of the glass window.

3. The structure according to claim 1, wherein
the glass window is a front glass window, and
the surface is provided at a position closer to a vehicle body than a surface of the front glass window.

4. The structure according to claim 1, wherein
the glass window is a front glass window,
the structure further includes an exterior member provided along an edge portion on an opposite side of an edge portion where the drain member and the front glass window contact each other, and
a surface of the exterior member is provided to be flush with the surface of the drain member.

5. The structure according to claim 1, wherein a surface tension on the surface of the drain member is higher than a surface tension on a surface of the glass window.

6. The structure according to claim 1, wherein a surface tension of the communication path is higher than a surface tension on the surface of the drain member.

7. The structure according to claim 1, wherein an angle formed by a surface of the communication path and a surface, contacting the communication path, of the drain passage is obtuse.

8. The structure according to claim 1, wherein a length (Z) from the one end to the other end of the communication path satisfies:

$$Z < 2T \cos \theta / \gamma r;$$

wherein T is a surface tension of the communication path (RN); θ is a contact angle between water and a surface of the communication path (RN); γ is a specific gravity of the water; and r is the width of the communication path (RN/2).

* * * * *